W. E. BROUGHTON.
POSITIVELY DRIVEN RING ROLL.
APPLICATION FILED MAY 13, 1915.

1,158,627.

Patented Nov. 2, 1915.

INVENTOR
Winn E. Broughton
By Jas. H. Churchill
Atty.

UNITED STATES PATENT OFFICE.

WINN E. BROUGHTON, OF PEABODY, MASSACHUSETTS, ASSIGNOR TO THE TURNER TANNING MACHINERY COMPANY, OF PEABODY, MASSACHUSETTS, A CORPORATION OF MAINE.

POSITIVELY-DRIVEN RING-ROLL.

1,158,627.  Specification of Letters Patent.  Patented Nov. 2, 1915.

Application filed May 13, 1915. Serial No. 27,949.

*To all whom it may concern:*

Be it known that I, WINN E. BROUGHTON, a citizen of the United States, residing in Peabody, in the county of Essex and State of Massachusetts, have invented an Improvement in Positively-Driven Ring-Rolls, of which the following description, in connection with the accompanying drawings, is a specification, like characters on the drawings representing like parts.

This invention relates to a positively driven ring roll especially designed and adapted among other uses to be employed in machines for treating leather and particularly belt knife splitting machines.

The invention has for its object to provide a superior ring roll for the purpose specified, which is simple, inexpensive and durable as will be described. To this end, the ring roll is provided with ring members or sections of a roll or cylinder, arranged side by side on a shaft and capable of being moved radially with relation to said shaft, and said sections or ring members are coupled together for rotary movement without interfering with their radial movement by means interposed between adjacent sections or ring members, as will be described. These and other features of this invention will be pointed out in the claims at the end of this specification.

Figure 1:
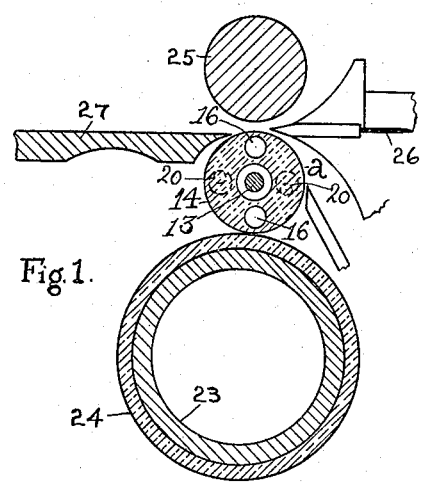
Figure 4:
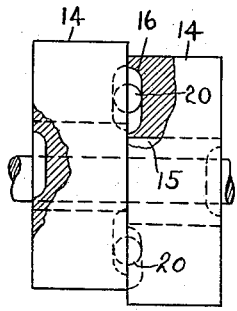
Figure 2:
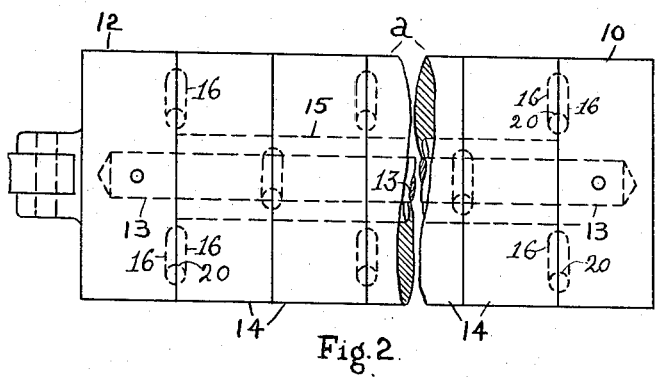
Figure 3:
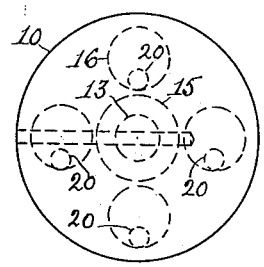

Figure 1 is a transverse section of a sufficient portion of a belt knife splitting machine provided with a ring roll embodying this invention to enable it to be understood. Fig. 2, an elevation of the ring roll shown in Fig. 1, with the members or sections concentric with one another. Fig. 3, an end elevation of the roll shown in Fig. 2 looking toward the left. Fig. 4, a detail of two sections or ring members, showing one depressed, and Fig. 5, an end elevation of the rings shown in Fig. 4.

Referring to the drawing and especially Figs. 2 to 5, $a$ represents one construction of ring roll embodying the invention. The ring roll $a$ as herein shown is composed of stationary end rings or sections 10, 12, which are fast on a shaft or center pin 13, and a plurality of intermediate movable sections or rings 14, each of which is provided with a central opening or bore 15 of larger diameter than the shaft 13 so as to permit said intermediate rings or sections to be moved radially with relation to the shaft after the manner represented in Figs. 4 and 5. The body portion of the rings 14 between their inner and outer circumferences is of substantial thickness, and said body portion is provided in its side faces with one and preferably with a plurality of recesses or sockets 16, which are arranged so that the sockets or recess 16 in one face of one ring will register with the sockets 16 in the face of an adjacent ring to form a receptacle for a device of a thickness or diameter greater than the depth of the socket 16 in the individual rings. The device referred to may and preferably will be a ball 20, whose diameter is substantially equal to the depth of the coöperating sockets or recesses, see Fig. 4, so that the rings 14 may be brought close together and preferably substantially in contact after the manner represented in Fig. 2 to form a roll having a continuous surface. The sockets or recesses 16 are made of a width greater than the diameter of the ball 15 contained in them, so as to permit the rings to be capable of being moved individually toward and from the shaft or center pin 13 and yet have all the rings coupled together for rotary movement simultaneously.

Figure 5:
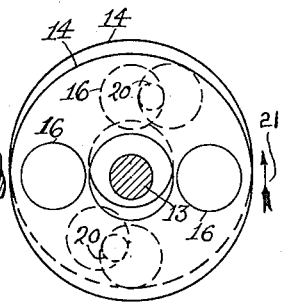

By reference to Figs. 4 and 5, it will be seen that one ring is depressed below its coöperating or adjacent ring, while at the same time the said rings are coupled together by the balls 20, so that when one ring is rotated in the direction indicated by the arrow 21 in Fig. 5, the adjacent ring will be rotated by means of the balls 20 which practically couple the two rings together.

It is preferred to employ balls as the coupling devices, as the friction between the rings is reduced to a minimum and the individual rings can thereby be moved toward and from the center pin or shaft 13 with the least possible pressure upon the circumferences of the rings, whereby the ring roll is rendered sensitive and will respond to slight variations in the thickness of the material being treated or acted upon. A ring roll such as hereindescribed is capable of being used in any machine in which the well known ring roll is used, and in Fig. 1 I have represented the ring roll $a$ herein shown as employed in a belt knife splitting machine of known construction and having the usual bed roll 23 provided with a rubber or other yielding cover or bolster 24, a gage or pressure roll 25, the belt knife 26 and the table 27.

The ring roll *a* has its intermediate or movable rings 14 normally resting on the rubber covered bed roll, with the movable rings concentric with the stationary end rings. When however a thicker portion of the leather or other material being split engages one or more of the movable rings, it or they is or are depressed or moved into an eccentric position with relation to the other rings to properly position the thick portion of the leather to the knife 26, after the manner represented in Fig. 4, which movement is permitted by the recesses 16 in the adjacent side faces of the rings, and this movement is effected without interfering with the rotary movement of the ring roll as a whole, which may be positively driven in any suitable manner.

The recesses 16 may be circular in shape as herein shown or they may be of any other suitable or desired shape. It may be preferred to provide each movable ring with two recesses 16 located substantially diametrically opposite, with the recesses on one face set quartering with relation to the recesses on the opposite face. It will thus be seen that while the rings are coupled together to be rotated as a single roll, the intermediate rings are capable of being moved individually radially with relation to the center pin or shaft with the least possible friction, and further that this radial movement can take place in all positions of the rings 14 in their circumferential movement.

Claims:

1. In a ring roll of the character described, in combination, a center shaft, end rings fixed to said shaft and provided with recesses in their inner faces, intermediate rings movable radially with relation to said center shaft and provided in their adjacent side faces with registering recesses and in the outer faces of the endmost intermediate rings with recesses which register with the recesses in said fixed rings, and balls located in the registering recesses of adjacent rings to couple them together for rotary movement while permitting the intermediate rings to be moved radially with relation to said shaft and end rings.

2. In a ring roll of the character described, in combination, a center shaft, end rings fixed to said shaft, intermediate rings movable radially with relation to said center shaft and provided in their adjacent side faces with registering recesses, devices located in the registering recesses of adjacent rings to couple them together for rotary movement while permitting them to be moved radially with relation to said shaft and means for coupling the movable intermediate rings with the fixed end rings to permit the intermediate rings to rotate with the end rings and to be moved radially with relation to said end rings.

3. In a ring roll of the character described, in combination, a plurality of rings arranged side by side, and means interposed between adjacent rings for coupling them together for rotary movement and to permit them to be individually moved in a radial direction.

4. In a ring roll of the character described, in combination, a plurality of rings having recesses in their adjacent faces registering with each other, and antifriction devices located in the recesses of adjacent rings to couple them together for rotary movement while permitting them to be moved radially.

In testimony whereof, I have signed my name to this specification in the presence of two subscribing witnesses.

WINN E. BROUGHTON.

Witnesses:
GEORGE H. CAVANAGH,
ANNIE E. MCCLURE.

Copies of this patent may be obtained for five cents each, by addressing the "Commissioner of Patents, Washington, D. C."